United States Patent
Wang et al.

(10) Patent No.: US 9,645,054 B2
(45) Date of Patent: May 9, 2017

(54) METHOD FOR DETERMINING REDUCTION FACTOR OF BEARING CAPACITY OF AXIAL LOAD CYLINDRICAL SHELL STRUCTURE

(71) Applicant: Dalian University of Technology, Dalian (CN)

(72) Inventors: Bo Wang, Dalian (CN); Peng Hao, Dalian (CN); Gang Li, Dalian (CN); Kuo Tian, Dalian (CN); Zeng Meng, Dalian (CN); Kaifan Du, Dalian (CN); Yan Zhou, Dalian (CN); Xi Zhang, Dalian (CN); Xiaohan Tang, Dalian (CN); Bin Wang, Dalian (CN); Hongzhi Luo, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 1 day.

(21) Appl. No.: 14/781,941

(22) PCT Filed: Feb. 12, 2014

(86) PCT No.: PCT/CN2014/000152
§ 371 (c)(1),
(2) Date: Oct. 2, 2015

(87) PCT Pub. No.: WO2014/161364
PCT Pub. Date: Oct. 9, 2014

(65) Prior Publication Data
US 2016/0187230 A1    Jun. 30, 2016

(30) Foreign Application Priority Data
Apr. 3, 2013  (CN) .......................... 2013 1 0113723

(51) Int. Cl.
*G01M 99/00* (2011.01)
*B64C 1/06* (2006.01)
*G06F 17/50* (2006.01)

(52) U.S. Cl.
CPC .......... *G01M 99/007* (2013.01); *B64C 1/068* (2013.01); *G06F 17/5018* (2013.01); *G06F 2217/16* (2013.01); *G06F 2217/46* (2013.01)

(58) Field of Classification Search
CPC .............. G01M 99/007; G06F 17/5018; G06F 2217/46; G06F 2217/16; B64C 1/068
See application file for complete search history.

(56) References Cited

PUBLICATIONS

Arbocz et al., Collapse of Axially Compressed Cylindrical Shells with Random Imperfections, 1995, Thin-Walled Structures 23, pp. 131-158.*

(Continued)

*Primary Examiner* — Toan Le
(74) *Attorney, Agent, or Firm* — Matthias Scholl, PC; Matthias Scholl (57) ABSTRACT

A method for determining a reduction factor of a bearing capacity of an axial load cylindrical shell structure is described. In the method, a depression defect is introduced in a manner of applying a radial disturbance load. Then, an influence rule of a depression defect amplitude of a single point to an axial load bearing capacity is analyzed by using numerical values; then, defect sensitivity analysis is performed on depression defects of multiple points; then, experiment design sampling is performed by using load amplitude values and load position distribution as design variables; and finally, the most disadvantageous disturbance load of the multiple points that limits the defect amplitude is searched for, and a reduction factor of the bearing capacity of the axial load cylindrical shell structure is determined.

1 Claim, 11 Drawing Sheets

(56) References Cited

PUBLICATIONS

Wu Xiangguo et al., Influence of Distributed Axisymmetrical Imperfections on Buckling Reliability of Thin Walled Cylindrical Shells, Journal of Harbin Engineering University, Jun. 2009, pp. 635-638, vol. 30, No. 6, Harbin Engineering University, China.

* cited by examiner

Buckling load [kN]     Radial concentrated force [N]

Buckling load [kN]    Iteration times

FIG. 7

Buckling load [kN]    Outer layer update steps

Buckling load [kN]    Iteration times

METHOD FOR DETERMINING REDUCTION FACTOR OF BEARING CAPACITY OF AXIAL LOAD CYLINDRICAL SHELL STRUCTURE

CROSS-REFERENCE TO RELATED APPLICATIONS

This application is a National Stage Appl. filed under 35 USC 371 of International Patent Application No. PCT/CN2014/000152 with an international filing date of Feb. 12, 2014, designating the United States, now pending, and further claims priority benefits to Chinese Patent Application No. 201310113723.8 filed Apr. 3, 2013. The contents of all of the aforementioned applications, including any intervening amendments thereto, are incorporated herein by reference.

FIELD OF THE INVENTION

The invention relates to stability analysis with respect to the thin-walled components carrying main load in aerospace or architectural structures, and more particularly to a method for determining a knockdown factor of load-carrying capacity of a cylindrical shell subjected to axial compression.

BACKGROUND OF THE INVENTION

A rocket body bears huge takeoff thrust in the launching phase, and thus the axial compressive load is the most important consideration to design a load-carrying structure of the body. A propellent tank reinforced by stiffeners bears huge axial compression even though the propellent tank is a secondary load-carrying structure of the rocket body. A new generation of large-diameter launch vehicle named CZ-5 is developed in China, and the diameter of the core structure is 5 m. Take the CZ-5 for example, even a liquid oxygen tank reinforced by stiffeners and having a diameter of 3.35 m in the booster system bears an axial compression load over 4000 kN. However, an axially compressed thin-walled component is very sensitive to initial imperfections, especially to initial geometrical imperfections, causing the ultimate load-carrying capacity of the structures estimated on the basis of a perfect model theory or data to be much smaller than that of the actual condition. Engineers always employ a "knockdown factor" (or correction factor) which is much smaller than 1 to correct the estimated load-carrying capacity. In general, when the ratio of radius to equivalent skin thickness of the shell is larger, imperfection sensitivity is larger, the knockdown factor is smaller, and an allowable load-carrying capacity employed in structure design is smaller when compared with the load-carrying capacity estimated based on the perfect model. As the launching load of the new generation of launch vehicles and heavy-lift launch vehicles in the future improve by leaps and bounds, the diameters of the rockets also tend to largely increase, and the imperfection sensitivity of load-carrying cylindrical shells becomes increasingly prominent, thus it is crucial to develop a novel method for determining the knockdown factor of load-carrying capacity of the cylindrical shell under axial compression.

Conventional methods for evaluating imperfection sensitivity of cylindrical shell, represented by NASA SP-8007, mainly employ a semi-empirical formula and yield the knockdown factor of the load-carrying capacity of the cylindrical shell based on a large quantity of experiments. With the development of manufacturing technology and material system, the conventional methods turn out to be extremely conservative, bringing in much costs and design redundancy. In view of the above-mentioned problems, many specialists employ the numerical analysis method to investigate the imperfection sensitivity of cylindrical shells. According to the method, initial imperfections such as an imperfection with first order eigen-mode shape, imperfection caused by radial perturbation load, and single dimple imperfection were introduced to the perfect cylindrical shell, and then the knockdown factor of the load-carrying capacity of the structure was yielded after calculating the data. Though large amount of related work has been carried out, a more physical method for determining the knockdown factor in consideration of the realistic worst imperfections has not been provided.

In conclusion, it is necessary to put forward an improved method for determining the knockdown factor of the load-carrying capacity of the cylindrical shell, which is convenient to be verified via experiments.

SUMMARY OF THE INVENTION

In view of the above-described problems, it is one objective of the invention to provide a method for determining a knockdown factor of load-carrying capacity of a cylindrical shell subjected to axial compression based on the combination of the perturbation loads that represents the realistic worst imperfection. The method introduces the multiple dimple imperfections, on the basis of optimization technologies such as an enumeration method, genetic algorithm and surrogate-based optimization, and yields the combination of a finite number of perturbation loads that causes the realistic worst imperfection, thereby determining the knockdown factor of the load-carrying capacity of the cylindrical shell. Compared with conventional methods for evaluating imperfection sensitivity based on experimental experiences, represented by NASA SP-8007, the invention is more physical, and convenient to be verified via experiments, and yields an estimation having higher fidelity and reliability.

To achieve the above objective, in accordance with one embodiment of the invention, there is provided a method for determining a knockdown factor of load-carrying capacity of a cylindrical shell subjected to axial compression. The method comprises the following steps:

1) introducing single dimple imperfection to a perfect cylindrical shell by applying radial perturbation load to the perfect cylindrical shell, calculating load-carrying capacities of the cylindrical shell subjected to axial compression with different amplitudes of dimple imperfection through finite element analysis, performing imperfection sensitivity analysis to obtain a relationship between radial perturbation load and its sensitivity to load-carrying capacity of structure, and determining a rational perturbation load range, where the considered maximum imperfection amplitude corresponding to a maximum perturbation load $N_{max}$ is determined by fabrication quality and detection tolerance;

2) performing imperfection sensitivity analysis using the combined dimple shape after introducing the dimple imperfections following the operations in 1), where a vertex of a regular polygon acts as the load position of the radial perturbation load.

In an example involving three dimple imperfections, defining a distance between a circumcenter and a vertex of a triangle as l, varying the distance l from zero, calculating corresponding buckling loads, and drawing a curve representing the relationship between the buckling load and the distance l; defining the distance corresponding to the minimum buckling load as an effective distance $l_e$. The effective distance $l_e$ can be used to approximately estimate a proper distance between each imperfection using such a combination, and assuming that the disadvantageous influences between adjacent load positions are covered. Assuming that the load positions are equally distributed on the cylindrical shell, and thus $S_a$ and $S_c$ are the distances of two adjacent load positions in the axial and circumferential directions, respectively, $n_a$ and $n_c$ are the numbers of load positions in the axial and circumferential directions, respectively, calculation formulas thereof being as follows:

$$S_a = l + 0.5l = 1.5l$$

$$S_c = \sqrt{3}\, l/2$$

$$n_a = \frac{L}{S_a} - 1 = \frac{2L}{3l} - 1$$

$$n_c = \frac{2\pi R}{S_c} = \frac{4\pi R}{\sqrt{3}\, l}$$

where, L is the axial height of the cylindrical shell, R is the radius of the cylindrical shell. The definition of the distance l under n dimple imperfections is the same as the definition under three dimple imperfections, i.e., under n dimple imperfections, the distance between the circumcenter and the vertex of n-sided regular polygon is l.

To facilitate calculation, herein defining l as $l_e$, and after determining $n_a$ and $n_c$, assigning a position number to each load position (the position number starting from zero degree at the bottom of the cylindrical shell, successively increasing from the bottom to the top along the axial direction, and successively increasing along the circumferential direction). Based on a large amount of previous analysis experiences, a comparatively large radial perturbation load does not necessarily lead to the minimum buckling load. Setting the amplitude of radial perturbation load N as a design variable, $N_{max}$ as the upper bound, zero or a small empirical value as the lower bound. Considering that large number of dimple imperfections increase the sampling points in design of experiment, which expends a high computation cost, and considering that the cylindrical shells in aerospace field with too many imperfections would be defined as substandard products in the industrial applications, it is suggested that an optimization is performed based on three dimple imperfections.

3) In the design of experiment, the amplitude of radial perturbation load N and the numbers of the load positions of the dimple imperfections $n_a$, $n_c$ are selected as variables; and 4) determining the combination of the perturbation loads that represents the realistic worst imperfection for the cylindrical shell using optimization technologies such as an enumeration method, genetic algorithm and surrogate-based optimization. The optimization objective is to minimize the buckling load of the cylindrical shell with the combined dimple imperfection. The optimization formulation is expressed as follows:

Design Variable: $X = [N, N_1, N_2, \ldots, N_n]$

Objective Function: $P_{cr}$

Subject to: $X_i^l \leq X_i \leq X_i^u, i = 1, 2, \ldots, n+1$ where, $N_n$ is the position number of nth radial perturbation load, $P_{cr}$ is the buckling load of the cylindrical shell subjected to axial compression, $X_i^l$ is the lower bound of ith variable (including the radial perturbation load N and the number of the load positions of the dimple imperfection $n_a$, $n_c$), and $X_i^u$ is the upper bound of ith variable (including the radial perturbation load N and the number of the load positions of the dimple imperfection $n_a$, $n_c$).

After the optimization, a knockdown factor (KDF) is calculated via a formula:

$$KDF = \frac{P_{cr}^{im}}{P_{cr}^{pe}}$$

where, $P_{cr}^{im}$ is the buckling load of axially compressed cylindrical shell with the combination of the perturbation loads that represents the realistic worst imperfection, and $P_{cr}^{pe}$ is the buckling load of the perfect axially compressed cylindrical shell.

Compared with existing technologies, advantages of the method according to embodiments of the invention are given below: different from conventional methods for evaluating imperfection sensitivity based on experimental experience, represented by NASA SP-8007, a single dimple imperfection is introduced by applying a radial perturbation load. First, the influence of the amplitude of a single dimple imperfection on the load-carrying capacity is investigated by numerical analysis, so as to determine a range of the load amplitude; then, imperfection sensitivity analysis is performed under multiple dimple imperfections; then, design of experiment is performed by using load amplitudes and load position distribution as design variables; and finally, based on optimization technologies such as the enumeration method, genetic algorithm and surrogate model, the combination of the perturbation loads that represents the realistic worst imperfection with limited amplitude is searched for, and the knockdown factor of the load-carrying capacity of the cylindrical shell is determined, so as to establish a more realistic, reliable, and physically meaningful method for evaluating the imperfection sensitivity and the load-carrying performance of the cylindrical shell subjected to axial compression. It is expected that the method tends to break the conventional norm based on experimental experiences existing at home and abroad, and becomes a method for determining the knockdown factor of the load-carrying capacity in the design of stiffened shells in heavy-lift launch vehicles in China.

DETAILED DESCRIPTION OF THE EMBODIMENTS

For further illustrating the invention, experiments detailing a method for determining a knockdown factor of load-carrying capacity of a cylindrical shell subjected to axial compression are described below. It should be noted that the following examples are intended to describe and not to limit the invention.

Figure 9:
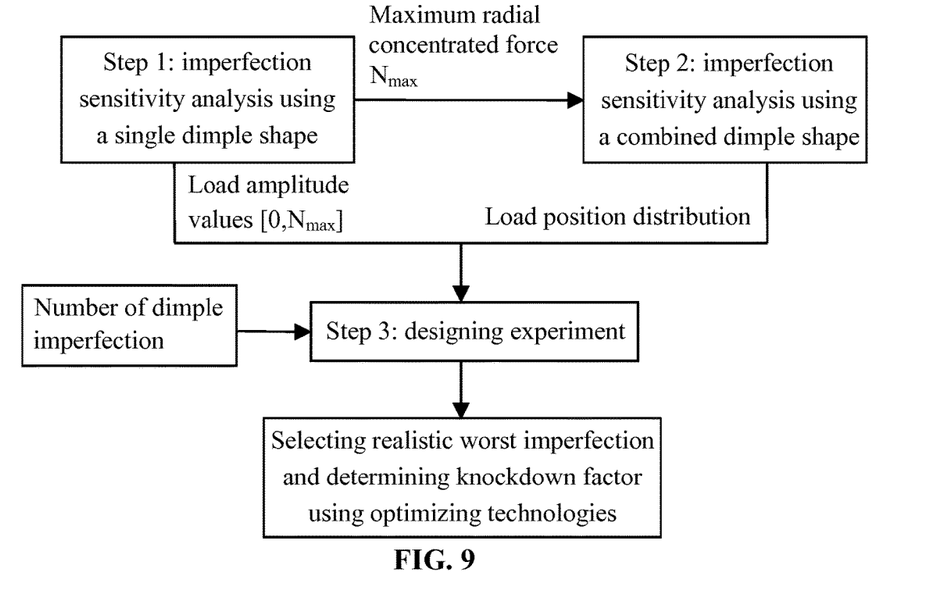
FIG. 9 is a flow chart of a method for determining a knockdown factor of load-carrying capacity of a cylindrical shell subjected to axial compression in accordance with one exemplary embodiment of the invention.

As shown in FIG. 9, a method for determining a knockdown factor of load-carrying capacity of a cylindrical shell subjected to axial compression comprises the following steps:

1) introducing dimple imperfections to a perfect cylindrical shell by applying radial perturbation load to the perfect cylindrical shell, calculating load-carrying capacities of the cylindrical shell subjected to axial compression with different amplitudes of dimple imperfection through finite element analysis, performing imperfection sensitivity analysis to obtain a relationship between radial perturbation load and its sensitivity to load-carrying capacity of structure, and determining a rational perturbation load range, where the considered maximum imperfection amplitude corresponding to a maximum perturbation load $N_{max}$ is determined by fabrication quality and detection tolerance;

2) performing imperfection sensitivity analysis using the combined dimple shape after introducing the dimple imperfections following the operations in 1), where a vertex of a regular polygon acts as the load position of the radial perturbation load.

Figure 1:
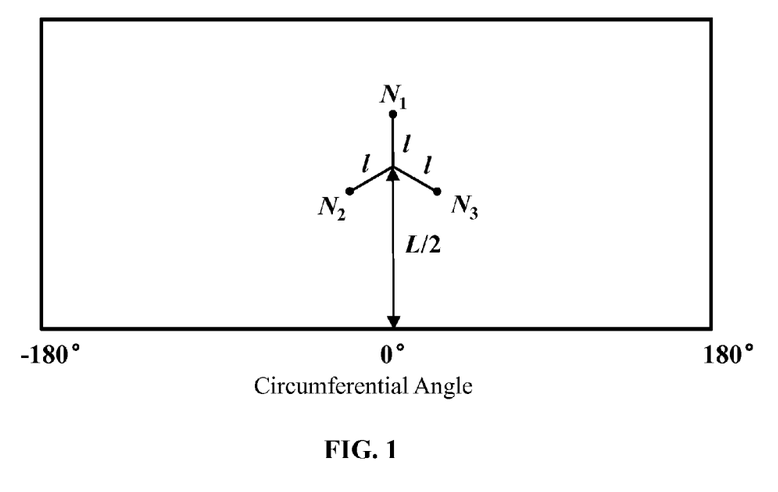
FIG. 1 is a schematic diagram of the distribution of the load positions of three dimple imperfections in accordance with one exemplary embodiment of the invention.

As shown in FIG. 1, in an example involving three dimple imperfections, defining a distance between a circumcenter and a vertex of a triangle as l, varying the distance l from zero, calculating corresponding buckling loads, and drawing a curve representing the relationship between the buckling load and the distance l; defining the distance corresponding to the minimum buckling load as an effective distance $l_e$. The effective distance $l_e$ can be used to approximately estimate a proper distance between each imperfection using such a combination, and assuming that the disadvantageous influences between adjacent load positions are covered. Assuming that the load positions are equally distributed on the cylindrical shell, and thus $S_a$ and $S_c$ are the distances of two adjacent load positions in the axial and circumferential directions, respectively, $n_a$ and $n_e$ are the numbers of load positions in the axial and circumferential directions, respectively, calculation formulas thereof being as follows:

$$S_a = l + 0.5l = 1.5l$$

$$S_c = \sqrt{3}\,l/2$$

$$n_a = \frac{L}{S_a} - 1 = \frac{2L}{3l} - 1$$

$$n_c = \frac{2\pi R}{S_c} = \frac{4\pi R}{\sqrt{3}\,l}$$

where, L is the axial height of the cylindrical shell, R is the radius of the cylindrical shell. The definition of the distance l under n dimple imperfections is the same as the definition under three dimple imperfections, i.e., under n dimple imperfections, the distance between the circumcenter and the vertex of n-sided regular polygon is l.

Figure 2:
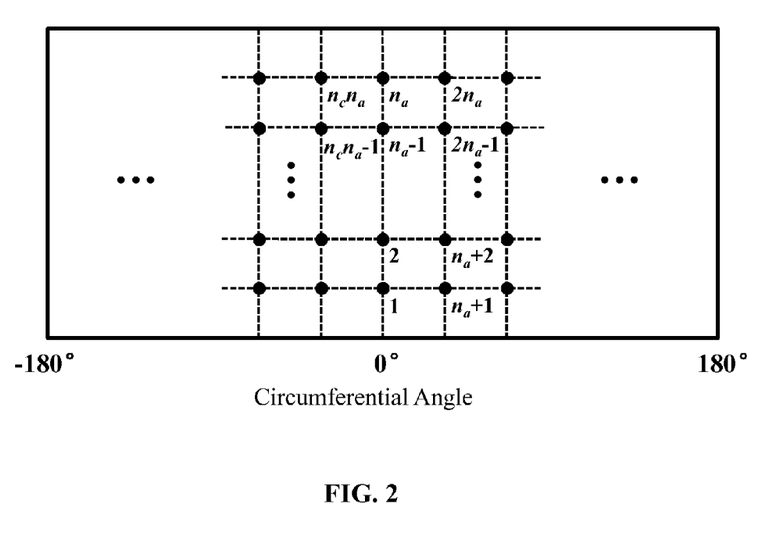
FIG. 2 is a schematic diagram of position numbers for the load positions in accordance with one exemplary embodiment of the invention.

To facilitate calculation, herein defining l as $l_e$, the combination shape can be used to approximately estimate a proper distance between each imperfection to know the realistic worst imperfection of the three dimple imperfections. After determining $n_a$ and $n_c$, as shown in FIG. 2, assigning a position number to each load position, the position number starting from zero degree at the bottom of the cylindrical shell, successively increasing from the bottom to the top along the axial direction, and then successively increasing along the circumferential direction; setting the amplitude of radial perturbation load N as a design variable, $N_{max}$ as the upper bound, zero or a small empirical value as the lower bound; considering the calculation efficiency, it is suggested that an optimization is performed based on three dimple imperfections.

Figure 3:
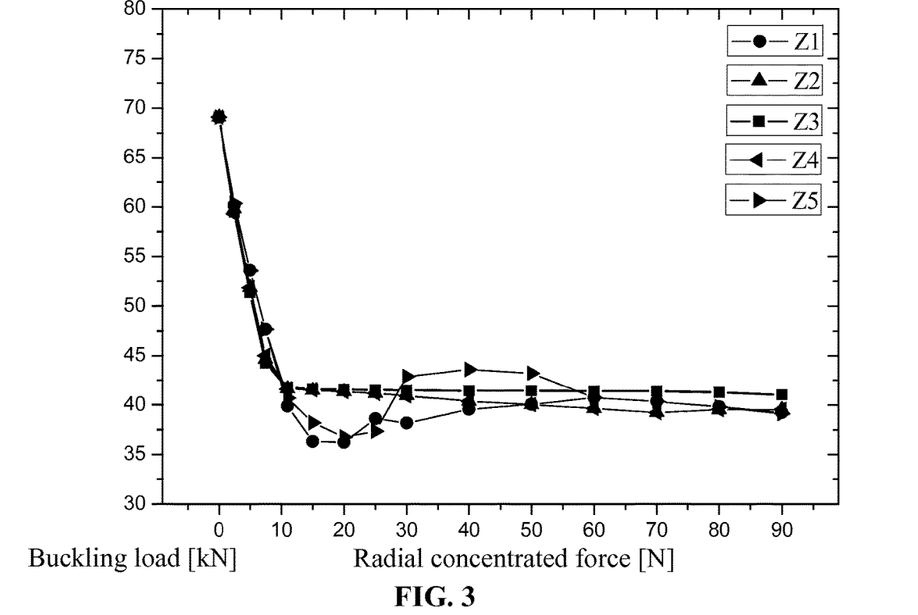
FIG. 3 is a curve of imperfection sensitivities of different dimple positions in a cylindrical shell in accordance with one exemplary embodiment of the invention.

As shown in FIG. 3, a comparatively large radial perturbation load does not necessarily cause the generation of the minimum buckling load, so the radial perturbation load N as a design variable, $N_{max}$ as an upper bound, zero or a small empirical value as a lower bound. Considering that large number of dimple imperfections increase the sampling points in design of experiment, which expends a high computation cost, and considering that the cylindrical shells in aerospace field with too many imperfections would be defined as substandard products in the industrial applications, it is suggested that an optimization is performed based on three dimple imperfections.

3) In the design of experiment, the amplitude of radial perturbation load N and the numbers of the load positions of the dimple imperfections $n_a$, $n_c$ are defined as variables; and 4) determining the combination of the perturbation loads that represents the realistic worst imperfection for the cylindrical shell using optimization technologies selected from an enumeration method, genetic algorithm and surrogate model. As shown in FIG. 2, the optimization objective is to minimize the buckling load of the cylindrical shell with the combined dimple imperfection. The optimization formulation is expressed as follows:

Design Variable: $X=[N,N_1,N_2, \ldots ,N_n]$

Objective Function: $P_{cr}$

Subject to: $X_i^l \le X_i \le X_i^u, i=1,2,\ldots ,n+1$ where, $N_n$ is the position number of nth radial perturbation load, $P_{cr}$ is the buckling load of the cylindrical shell subjected to axial compression, $X_i^l$ is the lower bound of ith variable (including the radial perturbation load N and the number of the load positions of the dimple imperfection $n_a$, $n_c$), and $X_i^u$ is the upper bound of ith variable (including the radial perturbation load N and the number of the load positions of the dimple imperfection $n_a$, $n_c$).

After the optimization, a knockdown factor (KDF) is calculated via a formula:

$$KDF = \frac{P_{cr}^{im}}{P_{cr}^{pe}}$$

where, $P_{cr}^{im}$ is the buckling load of axially compressed cylindrical shell with the combination of the perturbation loads that represents the realistic worst imperfection, and $P_{cr}^{pe}$ is the buckling load of the perfect axially compressed cylindrical shell.

Example 1

Figure 4A:
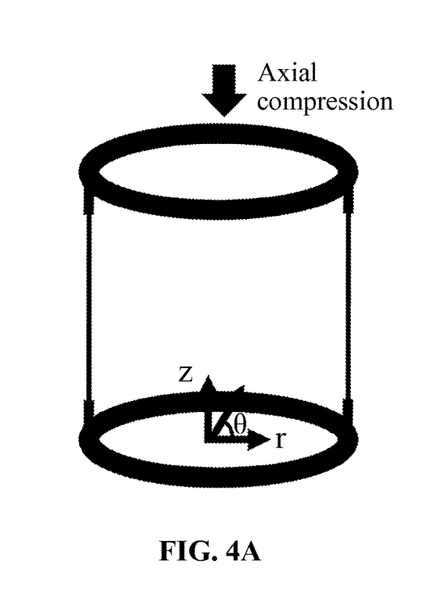
FIG. 4 is a schematic diagram of a metal cylindrical shell subjected to axial compression and T-rings in accordance with one exemplary embodiment of the invention.
Figure 4B:
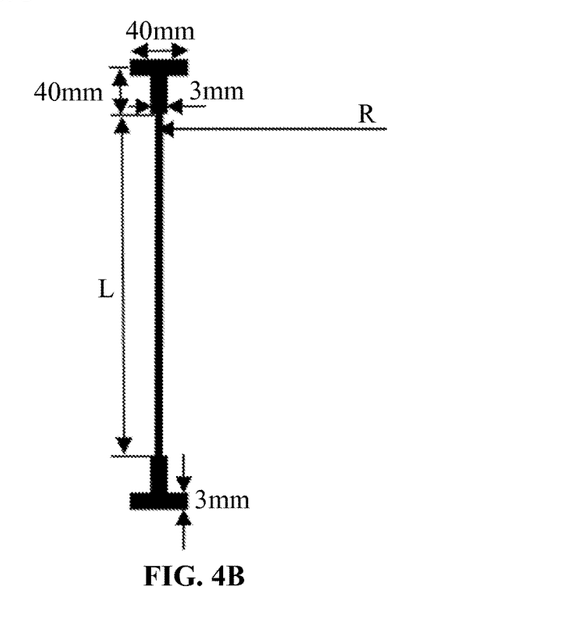

As shown in FIG. 4, a radius of the metal cylindrical shell R=250 mm, a length L=510 mm, a thickness t=0.5 mm. Material properties of 2024 aluminum alloy are as follows: elastic modulus E=72 GPa, Poisson's ratio ν=0.31, yield stress $\sigma_s$=363 MPa, ultimate stress $\sigma_b$=463 MPa, and density ρ=2.8E−6 kg/mm³. For the convenience of fixing and loading, T-rings are attached to both the bottom end and top end of the cylindrical shell, and made by the same material as the cylindrical shell. The bottom end of the T-rings is entirely clamped and the top end of the T-rings is constrained except for axial translational displacement.

Figure 5:
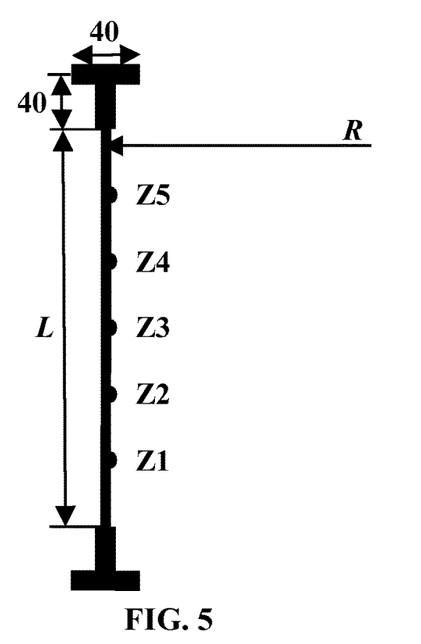
FIG. 5 is a schematic diagram of the distribution of five dimple positions (Z1 to Z5) along the axial direction in accordance with one exemplary embodiment of the invention.
Figure 6:
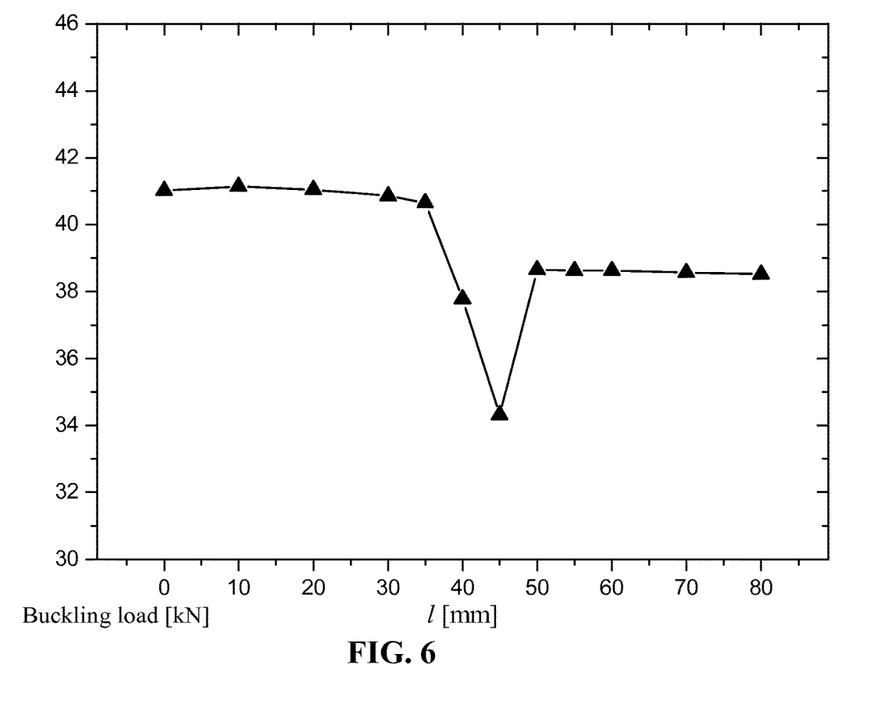
FIG. 6 is a schematic diagram of the influence of the distance l on the buckling load of a cylindrical shell in accordance with one exemplary embodiment of the invention.

As shown in FIG. 5, initial imperfections are introduced to the positions that are evenly distributed along the axial direction, and thereby a curve of the perturbation load vs. the buckling load of the structure can be drawn. When the initial imperfection (1.5 mm) is 3 times as thick as the shell skin, the corresponding radial perturbation load $N_{max}$ is 30 N. As shown in FIG. 1, imperfections at three load positions ($N_1$, $N_2$, and $N_3$) are introduced, and as shown in FIG. 6, the minimum buckling load occurs when l=45 mm and l is defined as $l_e$, therefore $n_a$=7 and $n_c$=40 after calculation, so the number of possible dimple positions on the shell skin are 280. The combination of the perturbation loads that represents the realistic worst imperfection is searched below using optimization technologies such as the enumeration method and surrogate model respectively.

Figure 7:
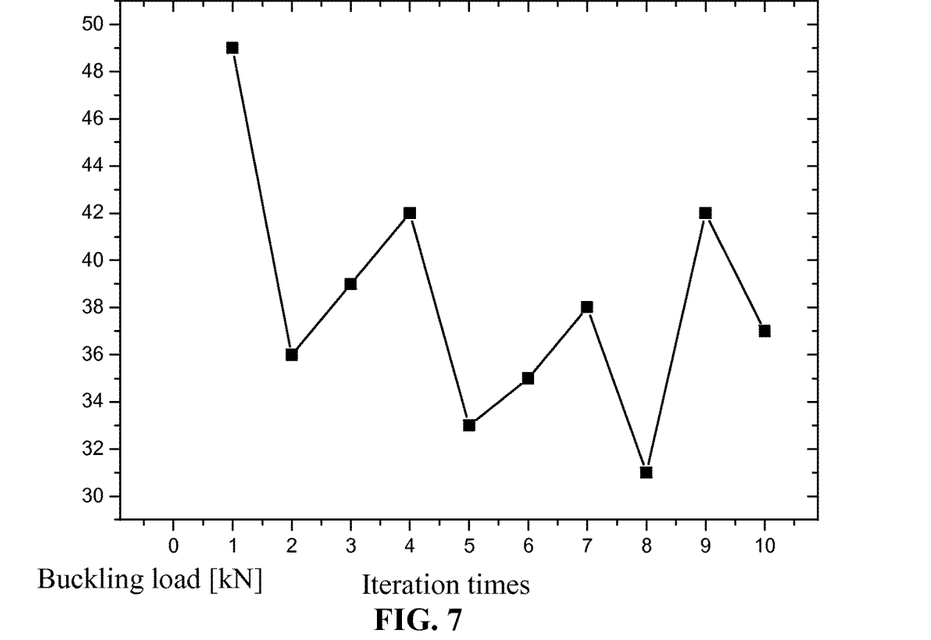
FIG. 7 is a schematic diagram of a searching process of the combination of the perturbation loads that represents the realistic worst imperfection based on an enumeration method in accordance with one exemplary embodiment of the invention.

1) The enumeration method. Ten combinations are generated randomly based on the 280 possible dimple positions, and the load-carrying capacity of the structure is thereby analyzed, as shown in FIG. 7, the minimum buckling load occurs at the eighth iteration, thus the eighth is considered as the combination of the perturbation loads that represents the realistic worst imperfection. Of course, more enumerations are beneficial for finding the realistic worst imperfection.

Figure 8:
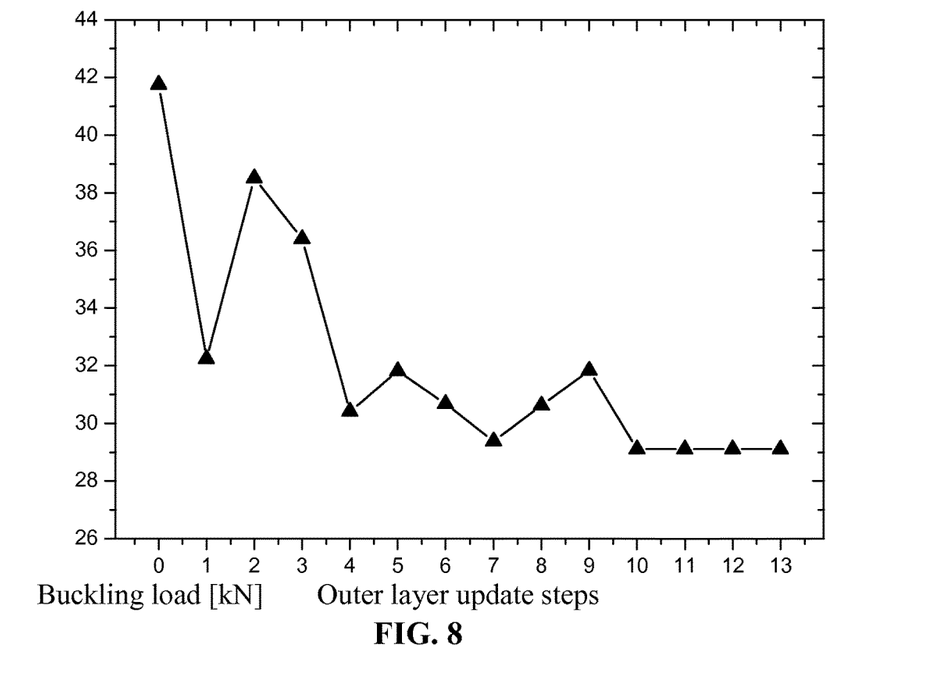
FIG. 8 is a diagram of a searching process of the combination of the perturbation loads that represents the realistic worst imperfection based on a surrogate model in accordance with one exemplary embodiment of the invention.

2) The surrogate model. In the design domain, 100 sample points are generated by performing a design of experiment, and thereby a surrogate model is built. Then a multi-island genetic algorithm is employed for optimization. An optimal solution is achieved at the thirteenth iteration, as shown in FIG. 8, and finally the knockdown factor is determined to be 0.42 which is better than the existing knockdown factor 0.32 suggested by the NASA SP-8007. The method effectively reduces design redundancy, and the improved knockdown factor can further decrease the structural weight.

Example 2

Figure 10A:
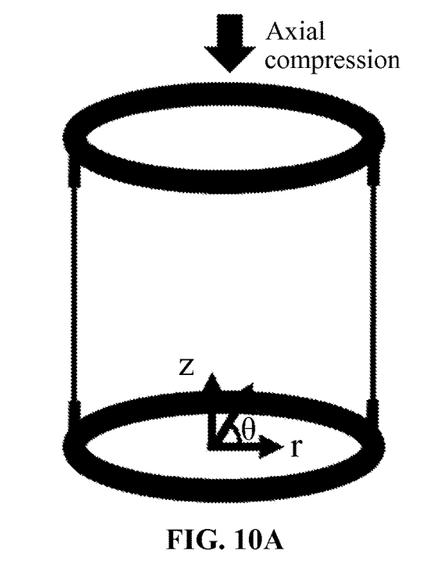
FIG. 10 is a schematic diagram of the axially compressed cylindrical shell made by composite materials, and metal T-rings in accordance with one exemplary embodiment of the invention.
Figure 10B:
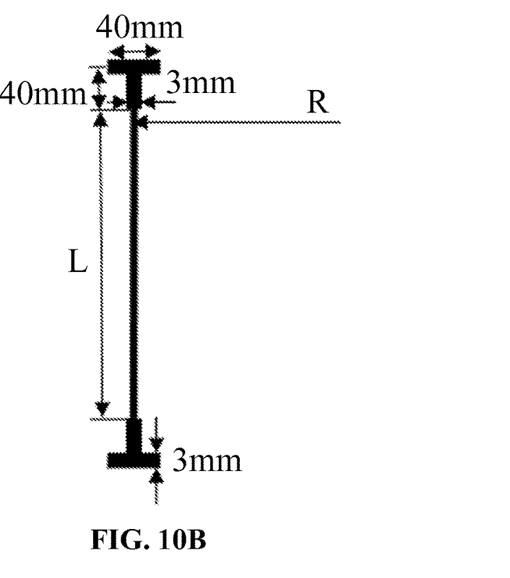
Figure 10C:
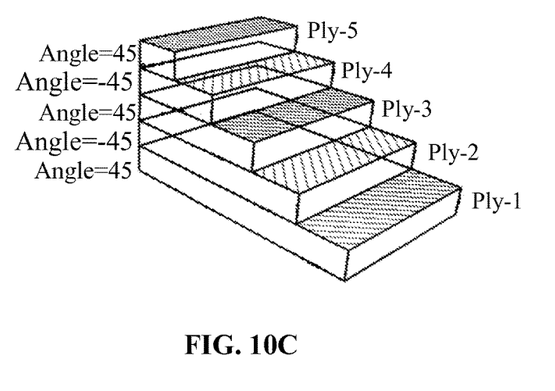

As shown in FIG. 10, a radius of a cylindrical shell made by composite materials R=250 mm, a length L=510 mm, a ply angle thereof is [45/−45/45/−45/45] and thickness of each layer t=0.1 mm. Material properties are as follows: $E_{11}$=84.56 GPa, $E_{22}$=6.86 GPa, $G_{12}$=$G_{13}$=4.9 GPa, $G_{23}$=1.96 GPa, $\nu_{12}$=0.3, ρ=1.7E−6 kg/mm³. For the convenience of fixing and loading, T-rings which are made by 2024 aluminum alloy are attached to both the bottom end and top end of the cylindrical shell. Material properties of the 2024 aluminum alloy are as follows: elastic modulus E=72 GPa, Poisson's ratio v=0.31, yield stress $\sigma_s$=363 MPa, ultimate stress $\sigma_b$=463 MPa, and density $\rho$=2.8E−6 kg/mm³. The bottom end of the T-rings is entirely clamped and the top end of the T-rings is constrained except for axial translational displacement.

Figure 11:
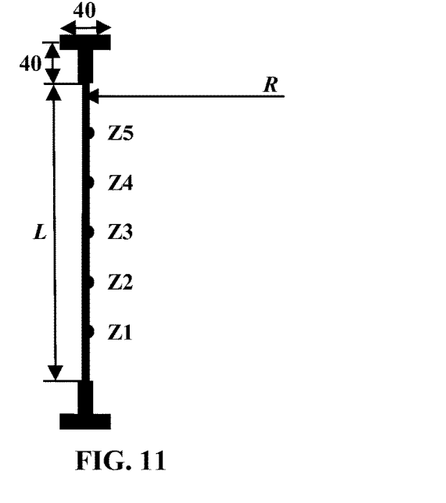
FIG. 11 is a schematic diagram of the distribution of five dimple positions (Z1 to Z5) along the axial direction of an axially compressed cylindrical shell made by composite materials in accordance with one exemplary embodiment of the invention.
Figure 12:
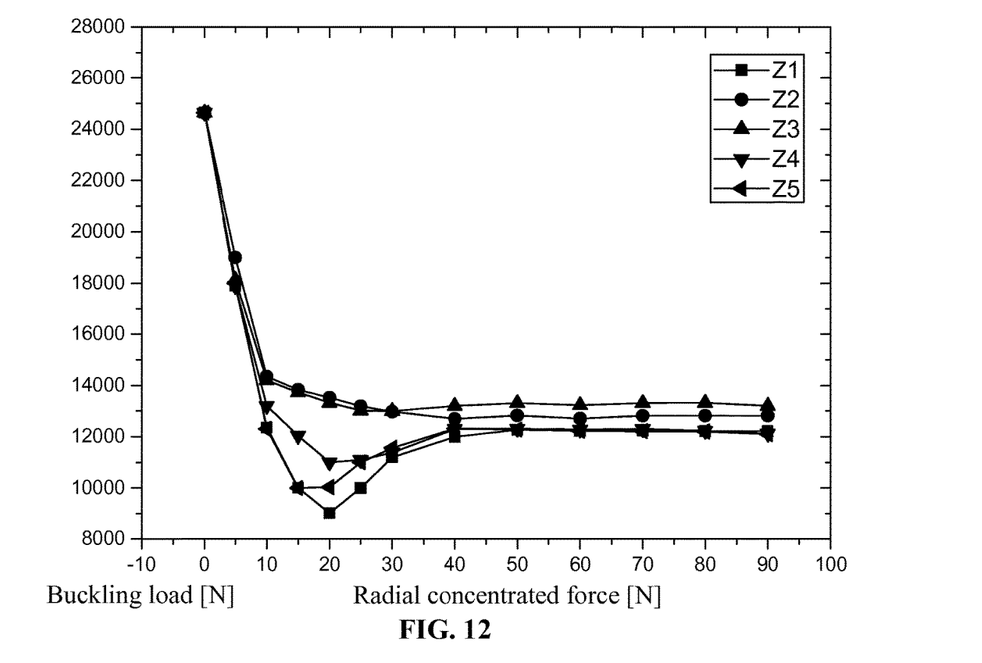
FIG. 12 is a curve of imperfection sensitivities of different dimple positions in an axially compressed cylindrical shell made by composite materials in accordance with one exemplary embodiment of the invention.
Figure 13:
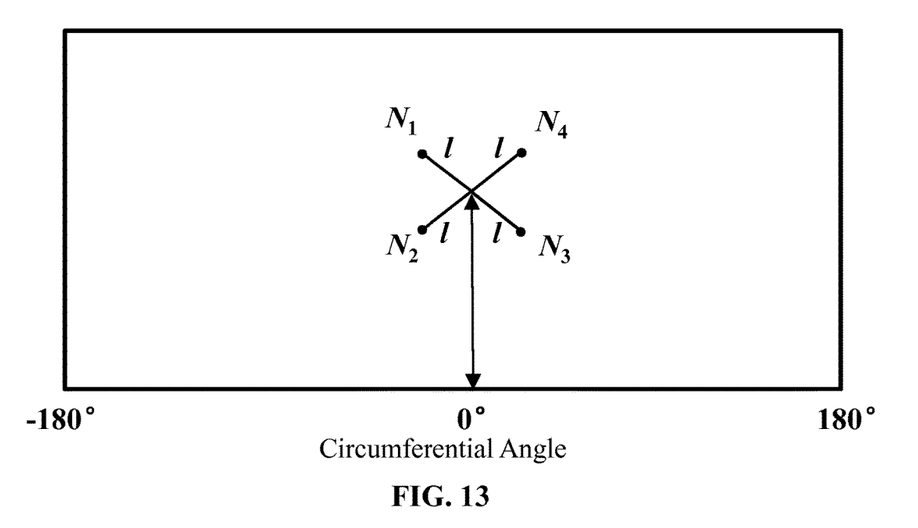
FIG. 13 is a schematic diagram of the distribution of the load positions of four dimple imperfections in an axially compressed cylindrical shell made by composite materials in accordance with one exemplary embodiment of the invention.

As shown in FIG. 11, initial imperfections are introduced to the positions that are evenly distributed along the axial direction, and thereby a curve of the perturbation load vs. the buckling load of the structure can be drawn, as shown in FIG. 12. Assuming that the initial imperfection (1.5 mm) is 3 times as thick as the shell skin, the corresponding radial perturbation load $N_{max}$ is calculated. As shown in FIG. 13, imperfections of four load positions ($N_1$, $N_2$, $N_3$ and $N_4$) are introduced, and corresponding value of l when the minimum buckling load occurs is searched for, then the l is defined as $l_e$, therefore $n_a$ and $n_c$ are yielded after calculation, so the number of possible dimple positions on the shell skin can be calculated. The combination of the perturbation loads that represents the realistic worst imperfection is searched below using optimization technologies such as the enumeration method and the surrogate model respectively.

Figure 14:
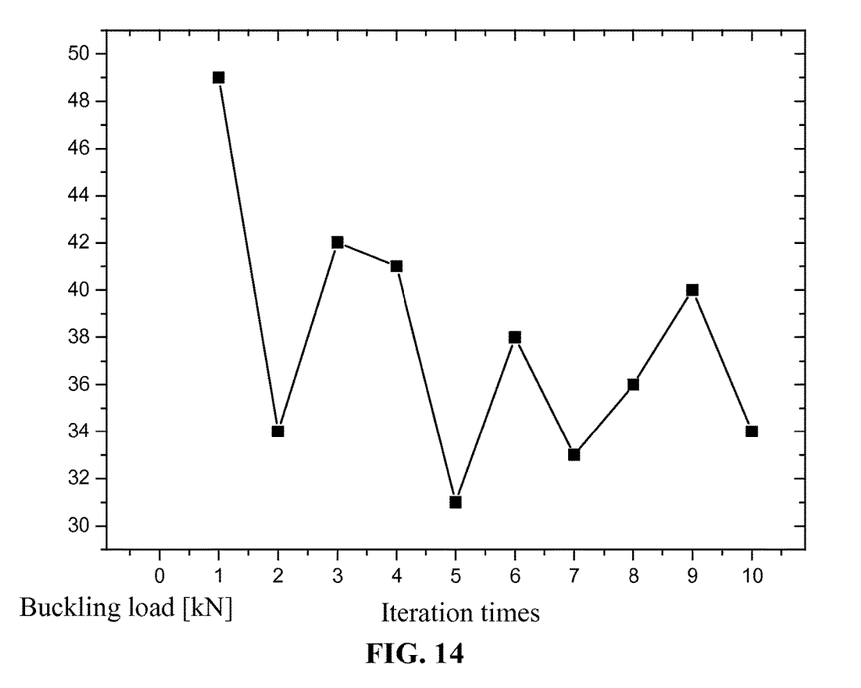
FIG. 14 is a diagram of a searching process of the combination of the perturbation loads that represents the realistic worst imperfection based on an enumeration method in an axially compressed cylindrical shell made by composite materials in accordance with one exemplary embodiment of the invention.

1) The enumeration method. Ten combinations are generated randomly based on the possible dimple positions, and the load-carrying capacity of the structure is thereby analyzed, as shown in FIG. 14, the minimum buckling load occurs at the fifth iteration, thus the fifth is considered as the combination of the perturbation loads that represents the realistic worst imperfection. Of course, more enumerations are beneficial for finding the realistic worst imperfection.

Figure 15:
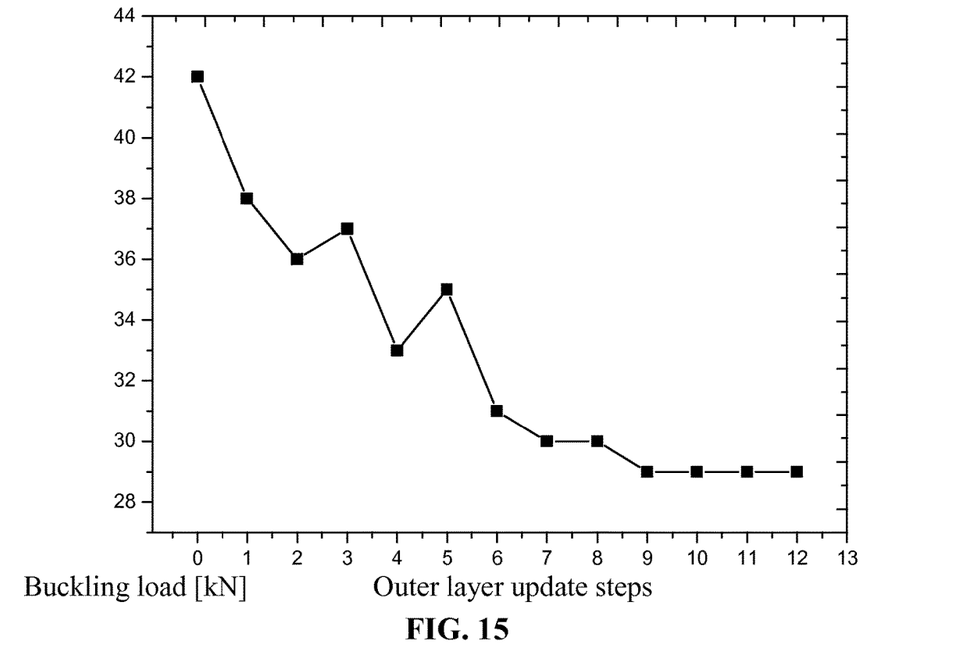
FIG. 15 is a diagram of a searching process of the combination of the perturbation loads that represents the realistic worst imperfection based on a surrogate model in an axially compressed cylindrical shell made by composite materials in accordance with one exemplary embodiment of the invention.

2) The surrogate model. In the design domain, 100 sample points are generated by performing a design of experiment, and thereby a surrogate model is built. Then a multi-island genetic algorithm is employed for optimization. An optimal solution is achieved at the twelfth iteration, as shown in FIG. 15, and finally the knockdown factor is determined.

Example 3

Figure 16A:
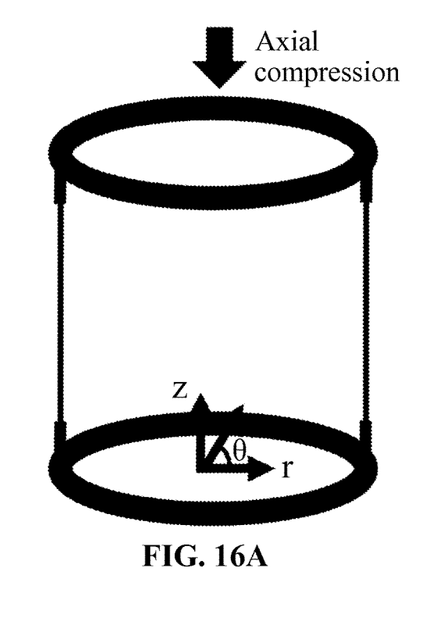
FIG. 16 is a schematic diagram of a large-size metal cylindrical shell subjected to axial compression and T-rings in accordance with one exemplary embodiment of the invention.
Figure 16B:
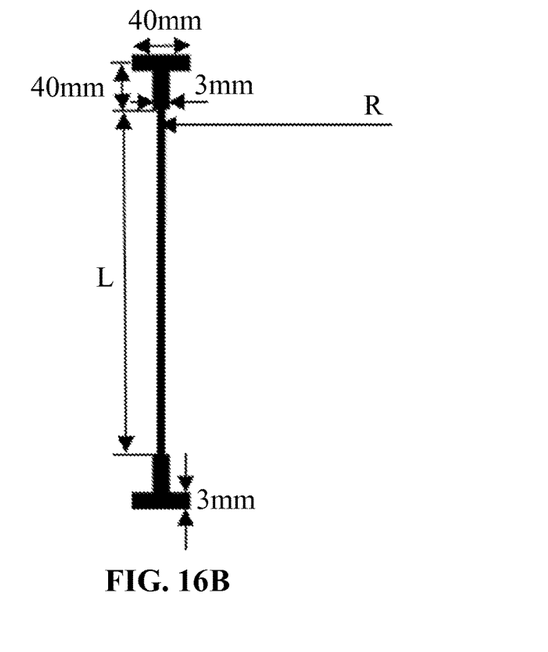

As shown in FIG. 16, a radius of the metal cylindrical shell R=300 mm, a length L=600 mm, a thickness t=0.5 mm. Material properties of the 2024 aluminum alloy are as follows: elastic modulus E=72 GPa, Poisson's ratio v=0.31, yield stress $\sigma_s$=363 MPa, ultimate stress $\sigma_b$=463 MPa, and density $\rho$=2.8E−6 kg/mm³. For the convenience of fixing and loading, T-rings are attached to both the bottom end and top end of the cylindrical shell, and made by the same material as the cylindrical shell. The bottom end of the T-rings is entirely clamped and the top end of the T-rings is constrained except for axial translational displacement.

Figure 17:
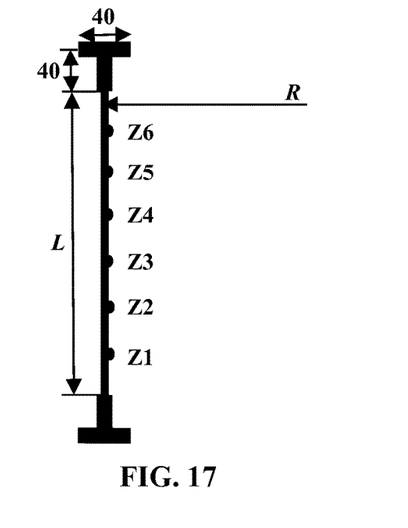
FIG. 17 is a schematic diagram of the distribution of six dimple positions (Z1 to Z6) along the axial direction of a large-size metal cylindrical shell subjected to axial compression in accordance with one exemplary embodiment of the invention.
Figure 18:
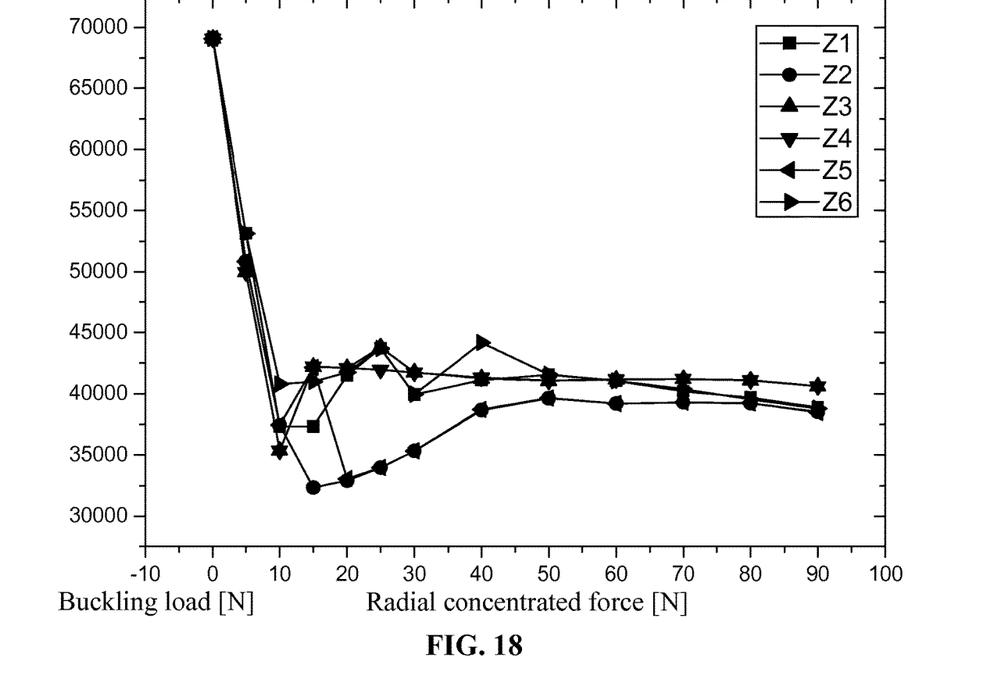
FIG. 18 is a curve of imperfection sensitivities of different dimple positions in a large-size metal cylindrical shell subjected to axial compression in accordance with one exemplary embodiment of the invention.
Figure 19:
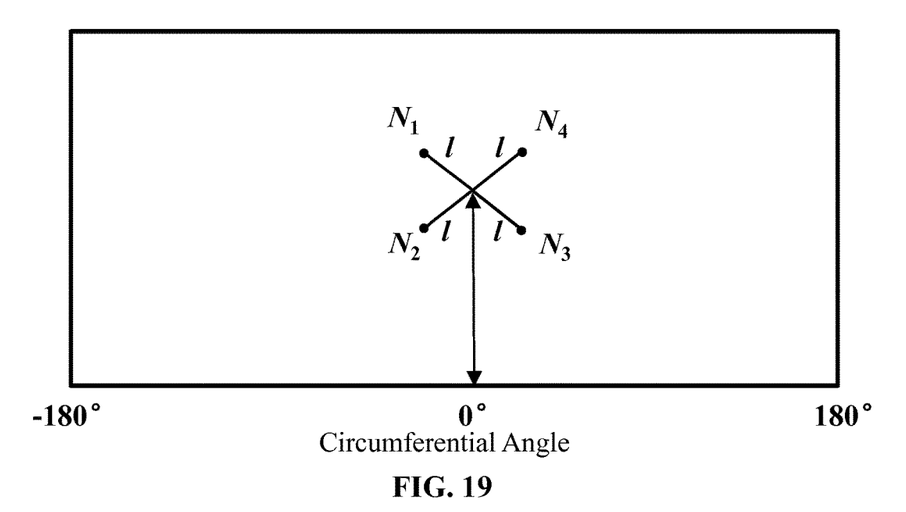
FIG. 19 is a schematic diagram of the load positions of four dimple imperfections in a large-size metal cylindrical shell subjected to axial compression in accordance with one exemplary embodiment of the invention.

As shown in FIG. 17, initial imperfections are introduced to the positions that are evenly distributed along the axial direction, and thereby a curve of the perturbation load vs. the buckling load of the structure can be drawn, as shown in FIG. 18. Assuming that the initial imperfection (1.5 mm) is 3 times as thick as the shell skin, the corresponding radial perturbation load $N_{max}$ is calculated. As shown in FIG. 19, imperfections of four load positions ($N_1$, $N_2$, $N_3$ and $N_4$) are introduced, and corresponding value of l when the minimum buckling load occurs is searched for, then the l is defined as $l_e$, therefore $n_a$ and $n_c$ are yielded after calculation, so the number of possible dimple positions on the shell skin can be calculated. The combination of the perturbation loads that represents the realistic worst imperfection is searched below using optimization technologies such as the enumeration method and the surrogate model respectively.

Figure 20:
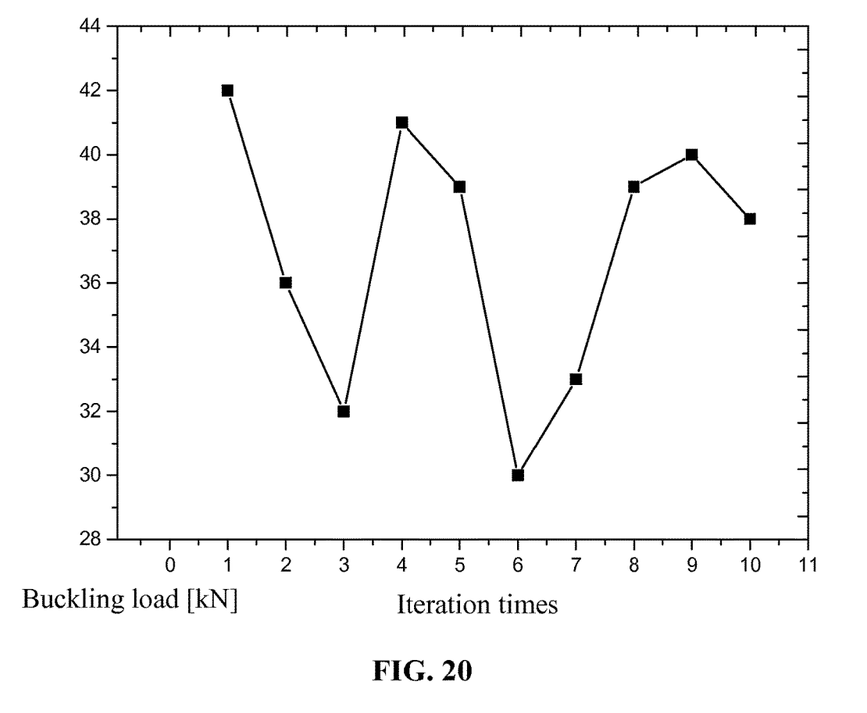
FIG. 20 is a diagram of a searching process of the combination of the perturbation loads that represents the realistic worst imperfection based on an enumeration method in a large-size metal cylindrical shell subjected to axial compression in accordance with one exemplary embodiment of the invention.

1) The enumeration method. Ten combinations are generated randomly based on the possible dimple positions, and the load-carrying capacity of the structure is thereby analyzed, as shown in FIG. 20, the minimum buckling load occurs at the sixth iteration, thus the sixth is considered as the realistic worst imperfection. Of course, more enumerations are beneficial for finding the realistic worst imperfection.

Figure 21:
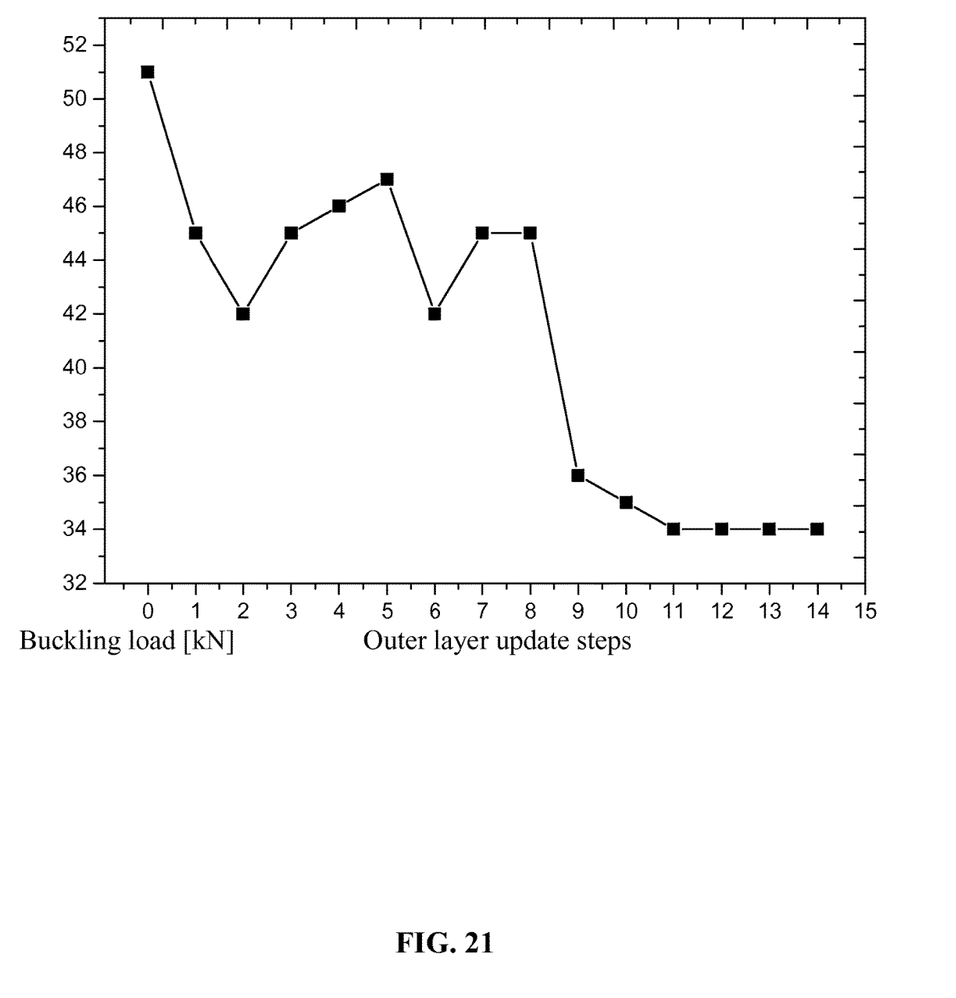
FIG. 21 is a diagram of a searching process of the combination of the perturbation loads that represents the realistic worst imperfection based on a surrogate model in a large-size metal cylindrical shell subjected to axial compression in accordance with one exemplary embodiment of the invention.

2) The surrogate model. In the design domain, 100 sample points are generated by performing a design of experiment, and thereby a surrogate model is built. Then a multi-island genetic algorithm is employed for optimization. An optimal solution is achieved at the fourteenth iteration, as shown in FIG. 21, and finally the knockdown factor is determined.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for determining a knockdown factor (KDF) of load-carrying capacity of a cylindrical shell subjected to axial compression, the knockdown factor being used for calculating the load-carrying capacity of the cylindrical shell, and the cylindrical shell having no dimple, the method comprising:

a) applying a first radial perturbation load to the cylindrical shell by using a load application device comprising T-rings attached to both bottom and top end of the cylindrical shell for forming a single dimple imperfection having an amplitude on the cylindrical shell; adjusting the amplitude of the single dimple imperfection and calculating load-carrying capacities of the cylindrical shell under the single dimple imperfection to obtain a relationship between the first radial perturbation load and a sensitivity to load-carrying capacity, and determining a rational perturbation load range, where a maximum imperfection amplitude corresponding to a maximum perturbation load $N_{max}$ is determined by fabrication quality and detection tolerance;

b) then simultaneously applying three radial perturbation loads on three load positions of the cylindrical shell by using the load application device for forming three dimple imperfections on the cylindrical shell, wherein the three dimple imperfections form a regular triangle; defining a distance between a circumcenter and a vertex of the regular triangle as l, varying the distance l from zero, calculating corresponding buckling loads, and drawing a curve representing a relationship between the buckling loads and the distance l; defining a distance corresponding to a minimum buckling load as an effective distance $l_e$, $S_a$ and $S_c$ being distances of two adjacent load positions in axial and circumferential directions, respectively, $n_a$ and $n_c$ being the numbers of load positions in the axial and circumferential directions, respectively, calculation formulas thereof being as follows:

$$S_a = l + 0.5l = 1.5l$$

$$S_c = \sqrt{3}\,l/2$$

$$n_a = \frac{L}{S_a} - 1 = \frac{2L}{3l} - 1$$

$$n_c = \frac{2\pi R}{S_c} = \frac{4\pi R}{\sqrt{3}\,l}$$

where, L is an axial height of the cylindrical shell, R is a radius of the cylindrical shell;

setting l to be equal to $l_e$, and after determining $n_a$ and $n_c$, assigning a position number to each load position, the position number starting from zero degree at the bottom of the cylindrical shell, successively increasing from bottom to top along an axial direction of the cylindrical shell, and then successively increasing along an circumferential direction of the cylindrical shell; setting amplitudes of the radial perturbation loads N as a design variable, $N_{max}$ as an upper bound, zero or a small empirical value as a lower bound;

c) in design of experiment, performing sampling by using the amplitudes of the radial perturbation loads N, $n_a$, and $n_c$ as variables; and d) calculating a combination of radial perturbation loads that is adapted to form a worst imperfection for the cylindrical shell by using an optimization formulation which is expressed as follows:

Design Variable: $X = [N, N_2, \ldots, N_n]$

Objective Function: $P_{cr}$

Subject to: $X_i^l \leq X_i \leq X_i^u, i=1,2,\ldots,n+1$ where, $N_n$ is the position number of an nth perturbation load, $P_{cr}$ is a buckling load of the cylindrical shell subjected to axial compression, $X_i^l$ is an upper bound of ith variable, and $X_i^u$ is a lower bound of ith variable;

calculating the knockdown factor (KDF) via a formula:

$$KDF = \frac{P_{cr}^{im}}{P_{cr}^{pe}}$$

where, $P_{cr}^{im}$ is a buckling load of the cylindrical shell when the cylindrical shell is under the combination of the radial perturbation loads, and $P_{cr}^{pe}$ is a buckling load of the cylindrical shell.

* * * * *